United States Patent [19]

Kirvutza

[11] 4,157,075
[45] Jun. 5, 1979

[54] BICYCLE SIGNAL DEVICE

[76] Inventor: John Kirvutza, 407 Lincoln Rd. North, East Rochester, N.Y. 14445

[21] Appl. No.: 840,558

[22] Filed: Oct. 11, 1977

[51] Int. Cl.² .......................... B60Q 1/30; B60R 5/00
[52] U.S. Cl. .............................. 116/56; 280/289 R; 340/134
[58] Field of Search .............. 116/56, 28 R, 41; 280/289 R; 340/134

[56] References Cited

U.S. PATENT DOCUMENTS

| | | | |
|---|---|---|---|
| 1,566,762 | 12/1925 | Miles | 116/56 X |
| 2,401,901 | 6/1946 | Blanchette | 116/56 |
| 3,099,243 | 7/1963 | Schwartz et al. | 116/28 R |
| 3,439,926 | 4/1969 | Bayard | 116/56 X |
| 3,478,713 | 11/1969 | Brames | 116/56 |

Primary Examiner—Daniel M. Yasich
Attorney, Agent, or Firm—Bernard D. Bogdon

[57] ABSTRACT

A bicycle signal device is disclosed which includes a mechanism to activate an attention-getting signal when the bicycle is in motion. The signal device is particularly useful both for safety and for amusement or attraction purposes and specifically can include an activator system of a pulley assembly driven by an axle of the bicycle. Linkages from the pulley assembly transfer motion to a signal such as a flag to move the flag in a predetermined pattern to readily attract attention.

12 Claims, 5 Drawing Figures

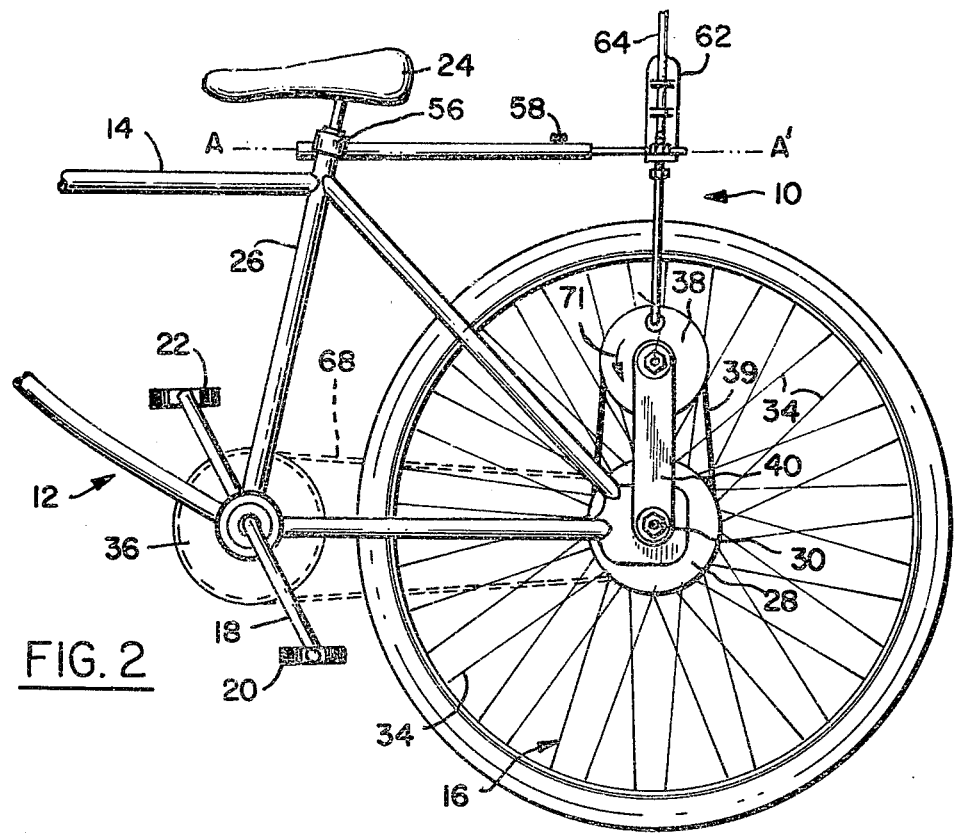
FIG. 2
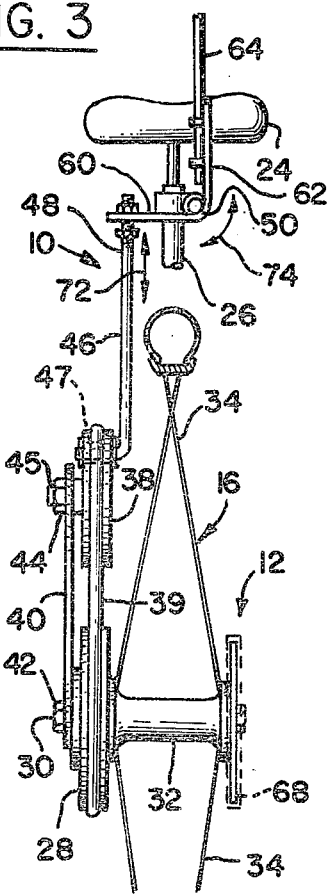
FIG. 3
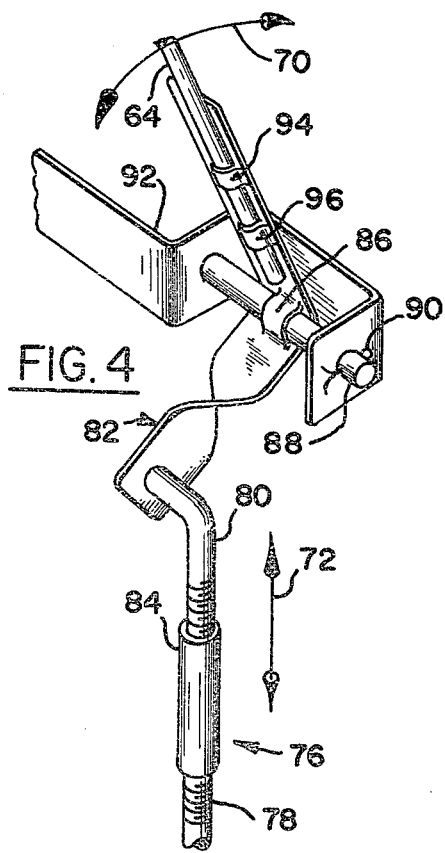
FIG. 4
FIG. 5

BICYCLE SIGNAL DEVICE

BACKGROUND OF THE INVENTION

1. Field of the Invention

The present invention is directed toward a bicycle signal accessory and particularly to a bicycle signal accessory including a signal caused to move in a designated pattern.

2. Description of the Prior Art

In the interest of safety, amusement and attracting attention for varied reasons, numerous devices have been provided as accessories for attachment to bicycles. A great number of devices are known for attachings flags to bicycles including various configurations of base mounts for flexible staffs. Flags or other signal devices attached to these base mounts thereby easily move under the influence of wind, and most generally due to the motion of the bicycle caused by the body action of the rider in pedalling the bicycle. Some base attachments are coil spring devices to promote movement of the staff and signal.

A device, such as the one disclosed in U.S. Pat. No. 3,009,243, issued on July 30, 1963 and entitled "Moving Signal Accessory for Bicycles," contemplates a moving signal device which attaches to the pedal crank of the bicycle to cause the signal and its mount to move in a vertical plane in an elliptical path as the bicycle is pedalled. This accessory activates a flag or other suitable signal attached to a staff to move the signal in the plane of the general direction of the bicycle or parallel to it.

The illustrated embodiment of that patent protrudes beyond the normal extremities of the bicycle. Additionally, except for the freedom of a specific signal mechanism, such as a flexible flag attached to the end of a post, the pattern of the movement of the signal is regular only in the plane of the bicycle. The flapping of the flag outside of that plane is irregular and is not being controlled. Such things as the ties of the flag, the flag material and a cross wind to the direction of the bicycle are the only types of factors which can influence the movement of the flag in a direction which is other than in the plane of movement of the bicycle. The accessory disclosed in that patent does not provide for any regular pattern of movement in any plane at any angle to the plane of the intended forward or rearward movement of the bicycle. Significant movement of the signal in a plane at an angle to the plane of motion of the bicycle is the type of movement which will be the most attention-getting.

SUMMARY OF THE INVENTION

This invention provides for a prominent and noticeable signal device attachable to wheeled vehicles and having a regular pattern of movement at an angle to the direction of movement of, for example, a bicycle to be readily detectable by those approaching or being approached by the bicycle. The signal is particularly noticeable to those traveling in the plane of the directed motion of the bicycle or parallel to that plane whether they are traveling in the same direction as the bicycle or approaching the bicycle while traveling in the opposite direction.

The accessory signal can be driven by any mechanism of a bicycle which rotates when the bicycle is in movement. Therefore, the signal device will be activated whether the bicycle is in a coasting mode, i.e. not being pedalled, or even while the bicycle is being walked. Substantial benefit from a safety standpoint is provided in this manner, since, for example, when the bicycle is being walked up a hill along a roadway the presence of the bicyclist and the bike is readily noticed.

One embodiment of the device includes a pulley system being driven off the rear axle of the bicycle. Other embodiments of the signal device anticipate power being provided by the axle of the front wheel or either of the wheels, such as may be provided by a rotary mechanism engaging a side wall of the tire and being appropriately linked to the moving signal through its staff. It will be appreciated that the signal device can be caused to operate by being attached to the pedal. When driven by the pedal or the pedal crank less satisfactory results are produced since the signal device will only be operable when the pedals are being cranked. The signal provided as the attention-getting device can be visible or audible and, for example, could be illuminated or noise producing through the action of its movement.

Additionally, the principles of this invention contemplates a bicycle safety signal device which does not extend the length or width of the bicycle through its attachments and provides signal movement in an attention-getting regular pattern. Further, embodiments of this invention can be adapted for use with unicycle or multiple wheel vehicles other than bicycles.

BRIEF DESCRIPTION OF THE DRAWINGS

FIG. 2 is a lateral view of the embodiment of the invention of FIG. 1 attached to the rear portion of a bicycle.

FIG. 3 is a view of the embodiment of the invention of FIG. 1 in the direction of the plane of the bicycle.

FIG. 4 is a partial alternate embodiment according to the principles of the invention.

FIG. 5 is another partial alternate embodiment according to the principles of the invention.

DETAILED DESCRIPTION OF THE PREFERRED EMBODIMENTS

Figure 1:
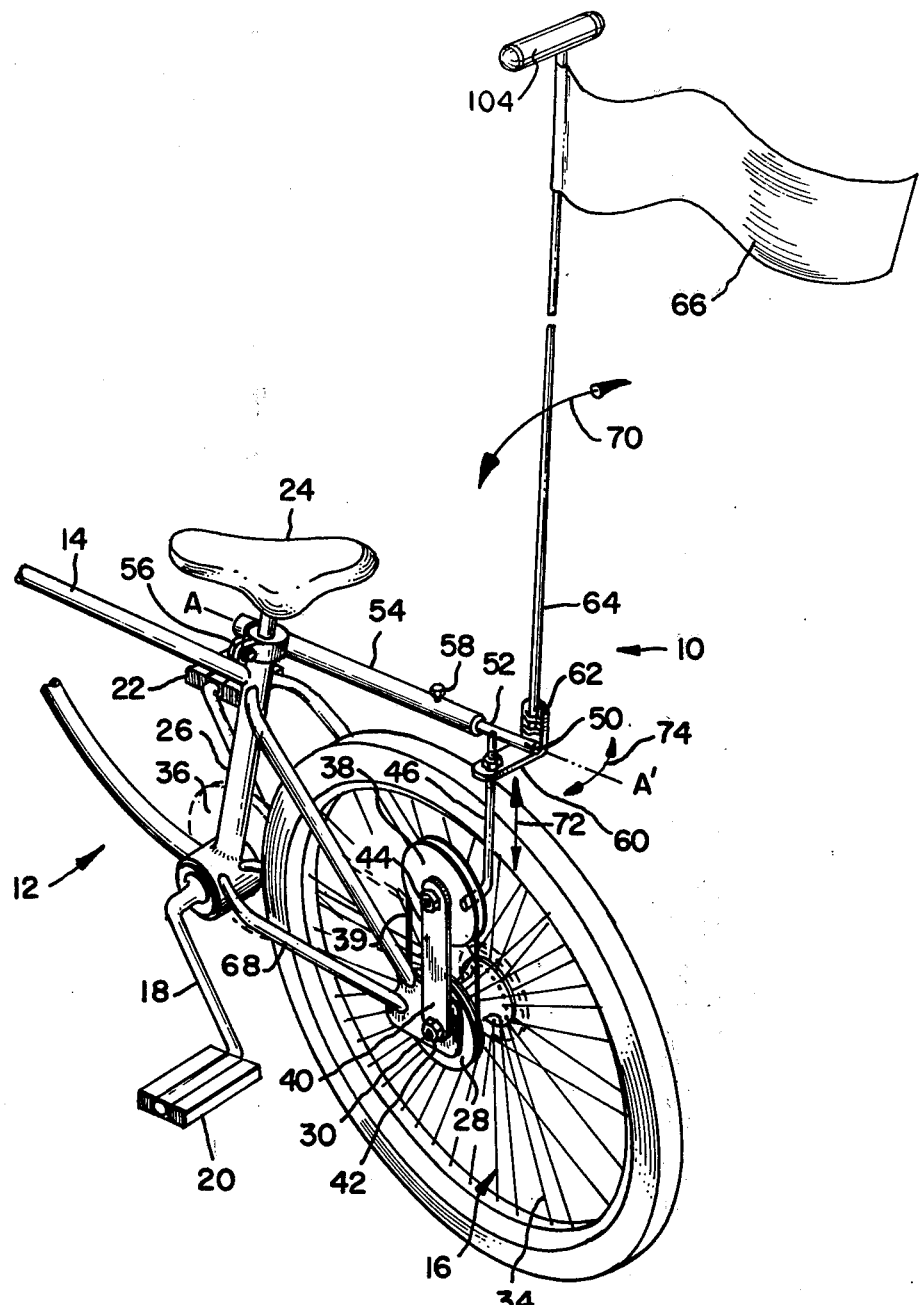
FIG. 1 is a perspective view of an embodiment according to the principles of the invention attached to the rear portion of a bicycle.

FIGS. 1-3 illustrate inventive embodiment signal device 10 attached to the rear portion of a bicycle 12. The bicycle 12 includes standard bicycle components including a frame 14, a rear wheel assembly 16, pedal crank 18, pedals 20 and 22, and a seat 24 with a seat support column 26 included as a part of the bicycle frame 14.

The signal device 10 is readily adaptable to be attached to such a standard bicycle configuration and with minor adjustments and in some cases small modifications, it can be assembled to most any bicycle and even other multiple wheel vehicles such as tricycles. The illustrated embodiment of FIGS. 1-3 contemplates a circular driving pulley 28 being attached, for example, to either the shaft 30 of the rear axle assembly 32, as best illustrated in FIG. 3, or the spokes 34 of the rear wheel assembly 16. The driving pulley 28 can be configured to engage the rear axle shaft 30 directly or can be configured with a central hexagonal or other appropriately shaped hole to be placed over any otherwise standard attachment nut secured to the axle shaft 30. Alternatively, the pulley 28 can be provided with attachment fingers which protrude from the lateral side of the pulley to engage and to be fastened to the spokes 34 of the rear wheel assembly 16. It will be appreciated that such configurations can readily be attached to any rotational part or device of the bicycle whether an attachment or portion of the bicycle such as the front wheel assembly or the pedal crank arm 18 or a drive sprocket wheel 36.

It is readily seen from the figures and particularly FIG. 3, that a second member or driven pulley 38 is mounted substantially in the plane of the driving pulley 28 to be caused to rotate by a belt 39 whenever the driving pulley 28 rotates due to the action of the rear wheel. The driven pulley 38 is secured and disposed substantially in the plane of the driving pulley 28 by means of a support strut 40 secured, for example, to the rear axle shaft 30 of the rear wheel assembly 16 by a nut 42. Support strut 40 has at its distal end a mount including a nut 44 securing a central rotational support, such as a partially threaded bolt 45, of the driven pulley 38 to as to allow the driven pulley 38 to rotate without hinderance and with minimum friction when the pulley belt 39 transfers power from the driving pulley 28.

As best seen in FIGS. 1 and 3, a crank assembly 46 is attached to the driven pulley 38 at a point off-center to the central rotational support 45 of the driven pulley 38. The crank assembly 46 is substantially of L-shape, with the base of the L engaging, as illustrated in FIG. 3, a clearance hole 47 in the body of the driven pulley 38. The base of the L-shape crank assembly 46 is secured to the driven pulley 38 by any suitable means in order to be free to rotate when operated. It will be appreciated that any type attachment to the driven pulley 38 by the crank assembly 46 is adequate provided the crank assembly 46 is free to follow the pulley 38 eccentrically about its center when it is driven by the pulley 28.

The distal end of the crank assembly 46 includes a threaded portion 48 which attaches to a three legged pivot assembly 50 at leg portion 60 in order to drive the signal device in the predetermined pattern. The attachment of the distal end of the crank assembly 46 to the leg portion 60 is such as to provide freedom of the intended movement of the crank assembly 46 substantially in the up and down directions and the pivot assembly 50 in its arcuate path. The action of the crank assembly 46 is least hindered when the support strut 40, the crank assembly 46 and the leg portion 60 of the pivot assembly 50 are substantially aligned at the uppermost and lowermost positions of travel of crank assembly 46.

As seen in the figures the three legged pivot assembly 50 includes a pivot rod 52 engaged to pivot in a strut 54 attached to, for example, a bicycle seat adjusting clamp 56. The pivot rod 52 is secured to stay within the clearance hole of the strut 54 to pivot. It is retained by any suitable means such as by a set screw 58 protruding through the strut 54 to ride in an annular groove, not illustrated, in the pivot rod 52. It will be appreciated that a snap spring arrangement will also prove to be suitable to retain the pivot rod 52.

Three legged pivot assembly 50 also includes an L-shaped bracket having, as hereinbefore mentioned, the leg 60 for attachment to the threaded end of crank assembly 46 and a leg 62 for securing, for example, a shaft 64 of a flag signal device 66. Pivot rod 52 is secured to the L-shape assembly by any suitable means such as welding or brazing or it can be integrally formed to obtain the desired configuration.

It will be appreciated that the L-shaped bracket of the pivot assembly or converter 50 need not be formed to define a right angle between the leg 60 and the leg 62 and is dependent upon the signal pattern desired and the point of attachment of the threaded portion 48 of the crank assembly 46 to the leg portion 60. Further, to obtain signal patterns which are at angles which are other than right angles to the plane of the bicycle and its direction, it will be appreciated that the pivot rod 52 can be mounted so as to be at an angle to the bike plane. Such a disposition provides for the signal device being more easily visibly noticed from a direction at right angles, or for that matter any angle, to the plane of the bicycle frame.

FIG. 4 illustrates an alternate embodiment for the three legged pivot assembly 50 and the crank assembly linkage 46 as shown in FIGS. 1–3. The embodiment of FIG. 4 offers certain simplicity to the construction of the assembly for driving the flag staff 64. In order to compensate for different size bicycles and for variations in bicycles of the same size, an adjustable crank arm assembly 76 is provided and can include, for example, a lower crank arm 78 for engaging the driven pulley 38 in any suitable manner, as hereinbefore mentioned, and an upper crank arm 80 for engaging an L-shaped bracket 82. The lower and upper crank arms are each threaded to engage a nut 84. The threads and substantially cylindrical nut 84 are of sufficient length to adjust the signal device accordingly to the size of the bicycle on which it is to be mounted. The L-shaped bracket 82 is illustrated as a stamped piece of material such as sheet metal having a pivot pocket 86 for cradling a pivot rod 88. The pivot rod 88 is secured at its respective ends as illustrated, for example, by cotter pin 90 to strut 92 which is configured to extend to and be secured by, for example, the seat adjusting clamp 56. The flag staff 64 is secured in place to one leg of the L-shaped bracket 82 by stamped cut outs 94 and 96.

A still further alternate embodiment is illustrated in FIG. 5. As an alternative to the threaded nut 84 of FIG. 4 is a clip 98. The clip 98 is crimped to secure a lower crank arm segment 100 which attaches to pulley 38, to an upper crank arm segment 102 which attaches to the L-shaped bracket 82. Both the lower arm segment 100 and the upper arm segment 102 are slidably adjustable within the clip 98 to be extended to a length to accommodate the bicycle size. The clip 98 can then be crimped to secure the lower and upper segments together in order that they move as one and act as a crank transfer the motion of the driven pulley 38.

In operation for the embodiment of FIGS. 1–3, it will be appreciated that when a cyclist pedals the bicycle 12 to rotate sprocket 36 engaged by the sprocket chain 68 to cause the rear wheel assembly 16 to rotate, the signal device 10, through the illustrated pulley system and connecting linkages, operates and waves back and forth in a plane of direction illustrated by double headed arrow 70. It should be appreciated, as hereinbefore stated, that the plane of direction can be varied. In the preferred embodiment the plane is substantially parallel to the axle of a wheel of, for example, the bicycle. It should be understood further that as long as the bicycle is in motion whether being ridden or not the signal device will operate. The signal operates even when the bicycle is moved backwards. From this it is readily seen that the rotary motion of, for example, a wheel is converted to a motion restricted to travel in a plane to drive the signal device in an oscillatory motion.

Since the drive pulley 28 is connected to the rear wheel assembly in any suitable manner, as hereinbefore mentioned, it causes the pulley belt 39, which engages pulley 28 by friction, to move and drive driven pulley 38, for example, in the rotational direction of arrow 71. As driven pulley 38 rotates, a crank linkage 46 follows the circular motion of the pulley and moves substantially in a back and forth linear direction as illustrated by double headed arrow 72. This crank motion in turn causes the three legged pivot mechanism 50 to pivot about the axis A—A' of the support strut 54 as indicated by double headed arrow 74. This action provides for movement of the flag 66 and flag staff 64, attached to the pivot assembly 50, in the direction of double headed arrow 70, as hereinbefore indicated.

It will be appreciated that the rate and path of the movement of the signal device 10 such as its flag 66, can be controlled by a great number of factors. For example, the flag staff 64 can be of an appropriate length to be not only readily visible, but provide for the flag signal to travel a greater or shorter path depending on the length of the staff 64. Further, the attachment of the crank shaft 46 to the leg portion 60 of the three legged assembly 50 can be varied as to be moved inward or outward from the pivot axis A—A' to increase or decrease the degree of movement of the flag staff 64. The distance between the nut attachments of the crank assembly 46 to the leg portion 60 of the three legged assembly can be varied to change the arc of travel of the flag staff 64. Likewise, the attachment of the crank assembly 46 to the driven pulley 28 can be moved inward or outward from its central axis of rotation to vary the travel of crank assembly 46. Further, the diameters of the pulley size can be varied to likewise add to the control of the oscillation and back and forth movement of the flag signal 66. A turn ratio of 2 to 1 of the drive pulley 28 to the driven pulley 38 is suitable. When the bicycle is moving at a fast pace, for example, when coasting downhill, the signal mechanism rate of movement is somewhat automatically controlled by a suitable selection of pulley belt and driven pulley which causes the belt to slip and automatically govern the speed of the signal device. Additionally, tandem driven pulleys can be mounted and a single belt can be manually moved between the driven pulleys to vary the rate of oscillation of the signal device.

It will be appreciated that strut 40, crank assembly 46, three legged pivot assembly 50, strut 54, crank arms 78 and 80, arm segments 100 and 102 and bracket 82 can be of any suitable material of sufficient strength. In these illustrated embodiments they can be formed from lightweight metals or high strength plastic materials. Likewise, the staff 66 can be of similar material and, for example, could be formed of fiber type glass to provide a great deal of flexibility in its movement and enhance the wipping action of the flag 66 to better attract attention. The pulleys can be of metal or plastic materials and can be, for example, easily formed in halves to be pressed together to form a groove therebetween for the belt 39. The belt 39 can be of suitable material such as rubber or synthetics used in the manufacture of O-ring gaskets or like devices.

If the rear wheel assembly hub 32 of the bicycle is suitably formed, it is possible to use two elastic O-rings disposed over the outside of the hub in juxtaposition to each other, so as to form a groove therebetween providing a seat for a pulley belt extending to engage the driven pulley 38.

Signal devices of configurations other than illustrated such as ones which are readily detectable at night can be attached and used separately or in combination. A lighted device 104, as seen in FIG. 1, can include a system to provide a white, colored or flashing light. The lamp of the light can be powered by a conventional wheel generator or be wired to a battery power pack stored at any suitable location on the bicycle such as under the seat 24 or on the accessory itself.

It should be appreciated that this invention is adaptable to any underway vessel. The vessel need not have wheels, and, for example, could include a boat. The power to drive the signal device can orginate from natural things such as the wind in the air, the current in a stream or be provided by motorized devices either, for example, electrically or combustion powered and, of course, in particular by the power of a human being such as by a pedalling action. Further, the configuration of the vehicle can be varied and in the case of a transportation device having wheels, the wheels can be of different size, with or without spokes, in line with each other or offset and any of the wheels can be driven. Further, in the case of a bicycle the aforementioned variations can exist and the bicycle can either be propelled by a pedalling action or a motorized device or both. Specific examples of other vehicles to which this invention can be adapted are a moped and a motorcycle or a motorbike.

From the foregoing, it will be seen that novel and advantageous provision has been made for carrying out the desired end. However, attention is again directed to the fact that variations may be made in the example apparatus and operational method disclosed herein without departing from the spirit and scope of the invention, as defined in the appended claims.

It is claimed:

1. A signal device operative to move to provide indication of the underway movement of a pedalled vehicle which has a frame supported by at least one wheel disposed about an axle attached to the frame, comprising:
   signal means;
   signal attachment means supportable by the vehicle frame for carrying the signal means for movement in an oscillatory pattern within a plane substantially parallel to the axle of the wheel; and
   signal drive means connected to the signal attachment means for engaging a member of the pedalled vehicle rotatable when the pedalled vehicle is in motion to drive the signal means through the signal attachment means in said oscillatory pattern as a function of the movement of the rotatable member to provide indication of the underway movement of the pedalled vehicle by the oscillating signal means.

2. The signal device as defined in claim 1, wherein the signal means is carried for movement in the plane substantially parallel to the axle of the wheel which plane is disposed at right angles to the direction of the movement of the pedalled vehicle.

3. The signal device as defined in claim 1, wherein the signal drive means engages the wheel of the pedalled vehicle when the vehicle is underway.

4. The signal device as defined in claim 3, wherein the signal drive means includes a pulley system having at least one pulley engaged to be driven by the wheel of the pedalled vehicle.

5. The signal device as defined in claim 4, wherein the signal drive means includes a pivot assembly driven by the pulley system for pivoting about a pivot axis for moving the signal means through the signal attachment means in an oscillatory pattern within the plane substantially parallel to the axle of the wheel.

6. The signal device as defined in claim 5, wherein the signal drive means further includes adjustable means for varying the rate of pivotal movement of the signal means with respect to the rotation of the wheel of the pedalled vehicle.

7. The signal device as defined in claim 6, wherein the signal means is a flag for movement in said oscillatory pattern within said plane which is disposed at an angle to the direction of movement of the pedalled vehicle and substantially parallel to the axle of the wheel of the pedalled vehicle.

8. The signal device as defined in claim 6, wherein the signal means includes an illuminated device for movement in said oscillatory pattern within said plane which is disposed at an angle to the direction of the movement of the pedalled vehicle and substantially parallel to the axle of the wheel of the pedalled vehicle.

9. The signal device as defined in claim 1, wherein the device is operable to move to provide indication of the underway movement of a bicycle and wherein the signal means is a flag for movement in said oscillatory pattern within said plane which is disposed at a right angle to the direction of movement of the bicycle and substantially parallel to the axle of the wheel of the parallel vehicle and wherein the signal drive means includes a pulley system including a first pulley for engaging the rear wheel of the bicycle to be driven thereby and a pulley belt engaging the first pulley for transferring the power provided to the first pulley to a second pulley included as a part of the pulley system and further including a pivotable assembly cooperatively engaged to the second pulley and to the flag through the signal attachment means for pivoting about a pivot axis to move the flag in said oscillatory pattern when the pulley system is driven by the rear wheel of the bicycle when the bicycle is in motion.

10. A signal device operative to move to provide indication of the underway movement of a bicycle which has a frame supported by two wheels at least one of which is disposed about an axle attached to the frame, comprising:
  signal means;
  signal attachment means supportable by the vehicle frame for carrying the signal means for movement in an oscillatory pattern within a plane substantially parallel to the wheel axle attached to the frame; and
  signal drive means connected to the signal attachment means for engaging a member of the bicycle rotatable when the bicycle is in motion to drive the signal means through the signal attachment means in said oscillatory pattern as a function of the movement of the rotatable member to provide indication of the underway movement of the bicycle by the oscillating signal means.

11. A method of oscillating a bicycle signal device in a direction at right angles to the direction of a moving bicycle to provide indication of the underway movement of the bicycle, comprising the steps of:
  rotating a wheel of the bicycle;
  coupling the bicycle wheel to drive a rotary drive member;
  converting the rotary motion of the bicycle wheel by said rotary drive member to pivotable motion by converter means;
  linking the converter means to an assembly engaging the signal device; and
  oscillating a bicycle signal device engaged with the assembly undergoing pivotal motion in a direction at right angles to the direction of the moving bicycle to provide indication of the underway movement of the bicycle.

12. The method of oscillating a bicycle signal device as defined in claim 11, wherein the step of rotating a wheel of the bicycle provides for rotating the rear wheel of the bicycle by pedalling the bicycle and the step of converting the rotary motion of the rear wheel includes rotating pulleys at least one of which is engaged to the rotating rear wheel of the bicycle and another of which is engaged to the converter means linked to an assembly engaging the signal device for oscillating the signal device.

* * * * *